United States Patent [19]
Membrino et al.

[11] 3,808,711
[45] May 7, 1974

[54] COLLISION AVOIDANCE RADAR SIMULATOR SYSTEM

[75] Inventors: Robert J. Membrino, Silver Spring; Edward F. Magee, Crofton, both of Md.

[73] Assignee: The Singer Company, Binghamton, N.Y.

[22] Filed: Apr. 13, 1972

[21] Appl. No.: 243,804

[52] U.S. Cl. .............................................. 35/10.4
[51] Int. Cl. ............................................. G09b 9/00
[58] Field of Search ...................................... 35/10.4

[56] References Cited
UNITED STATES PATENTS
3,571,479   3/1971   Horattus et al. ................... 35/10.4

*Primary Examiner*—T. H. Tubbesing
*Attorney, Agent, or Firm*—William Grobman; James C. Kesterson

[57] ABSTRACT

A training system for simulating marine radar includes a digital computer, standard radar display equipment, and interfaces connecting the two. This system is designed to utilize computer abilities and time better than earlier systems. In this system, a magnetic drum contains digital information representing all of the radar targets in the entire possible gaming area. At any time for any own ship, information representing the location of the ship is inserted into the computer which then locates the particular subset of information recorded on the drum for that location. The entire subset is transferred to core memory and utilized in the computer. The computer transforms the information from the rectangular coordinates in which it was stored on the drum into polar coordinates in which it will be displayed. The entire subset of information, in polar coordinates, is then stored in a separate memory, and the original subset in the original core memory is replaced by the subset for the next own ship. The polar coordinate information is applied to an interface where it is converted from digital information into video information. The interface contains separate registers for each of the own ship displays, and the information for a single sweep is stored in those registers for direct application to the display.

16 Claims, 7 Drawing Figures

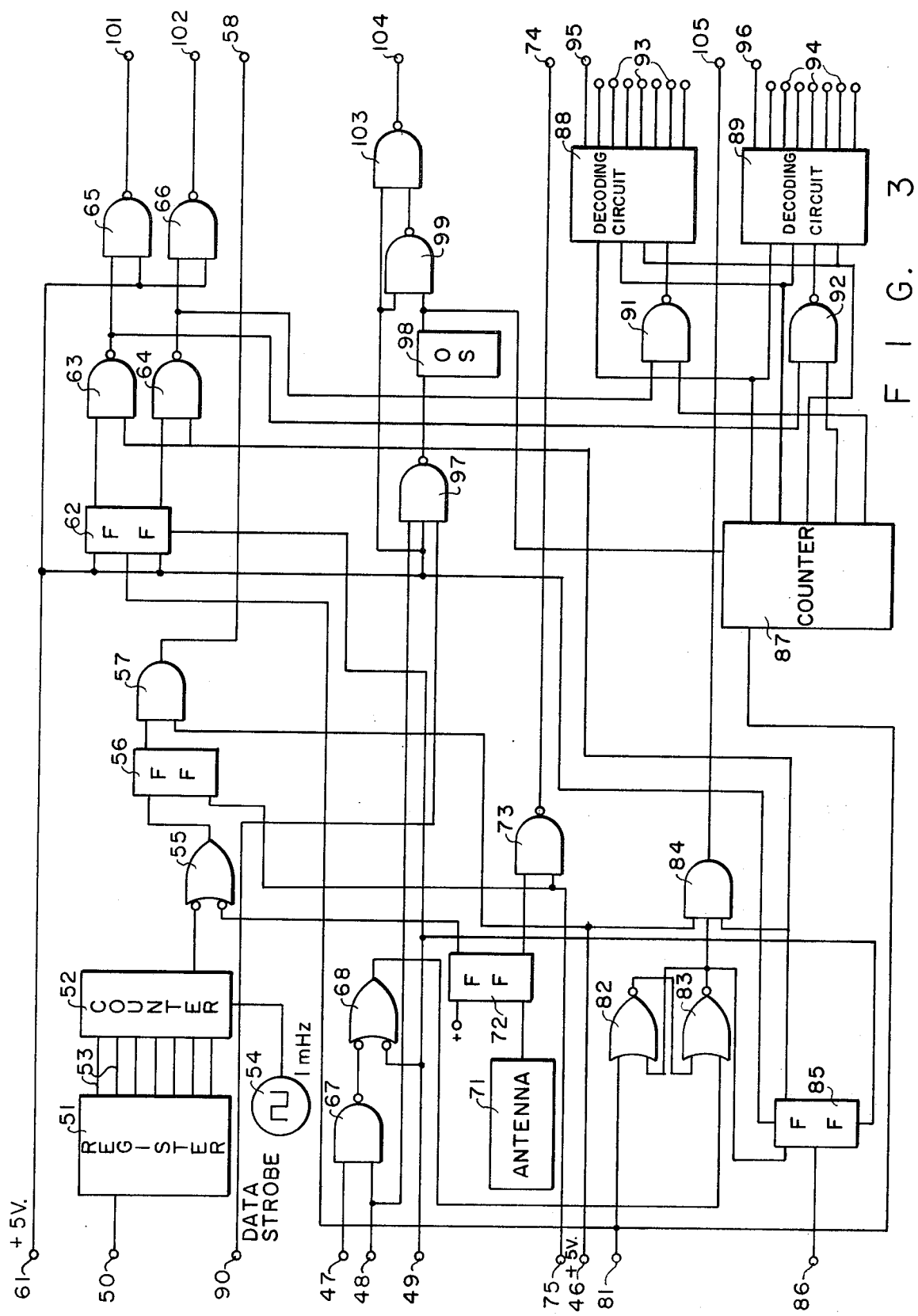

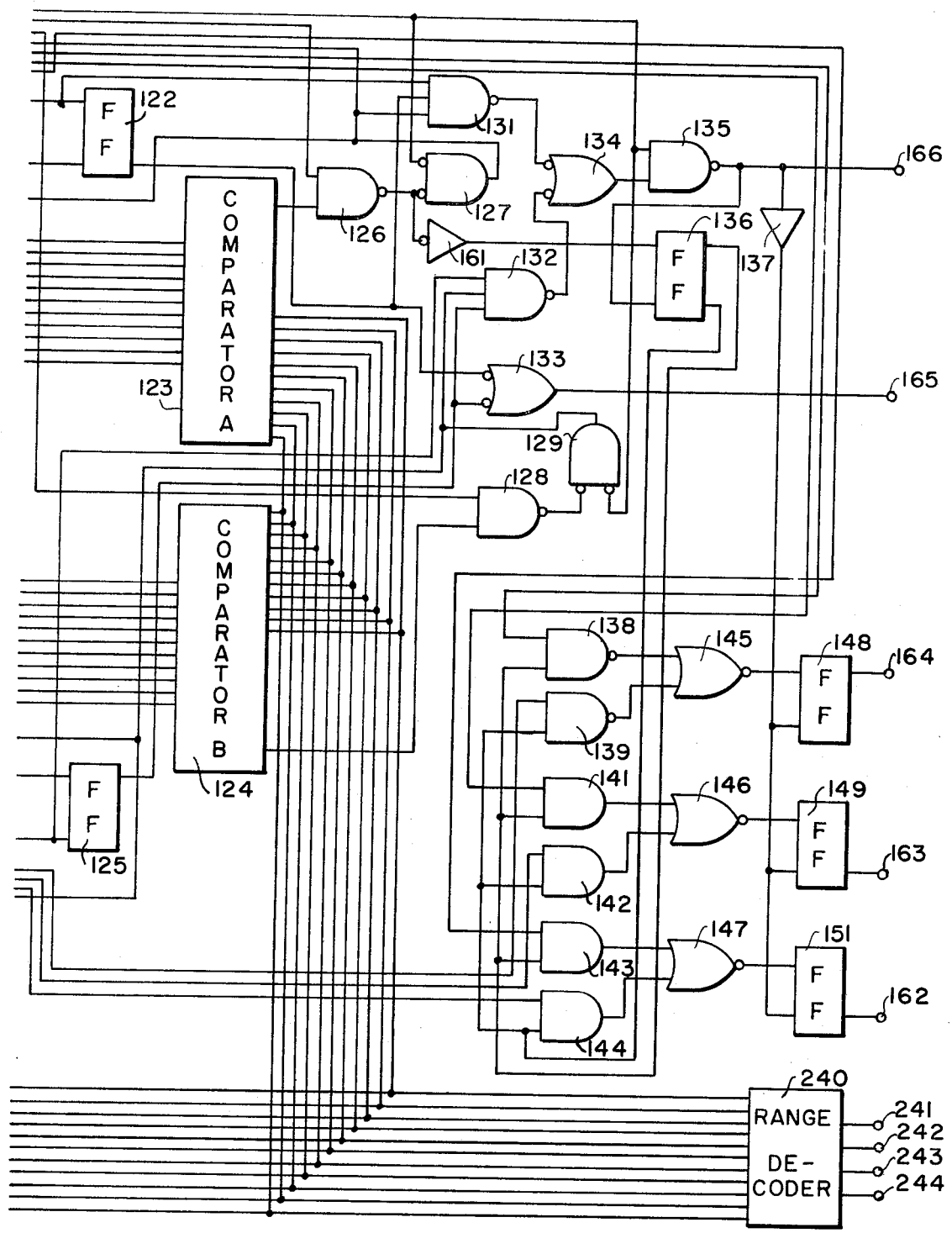
F I G. 4B

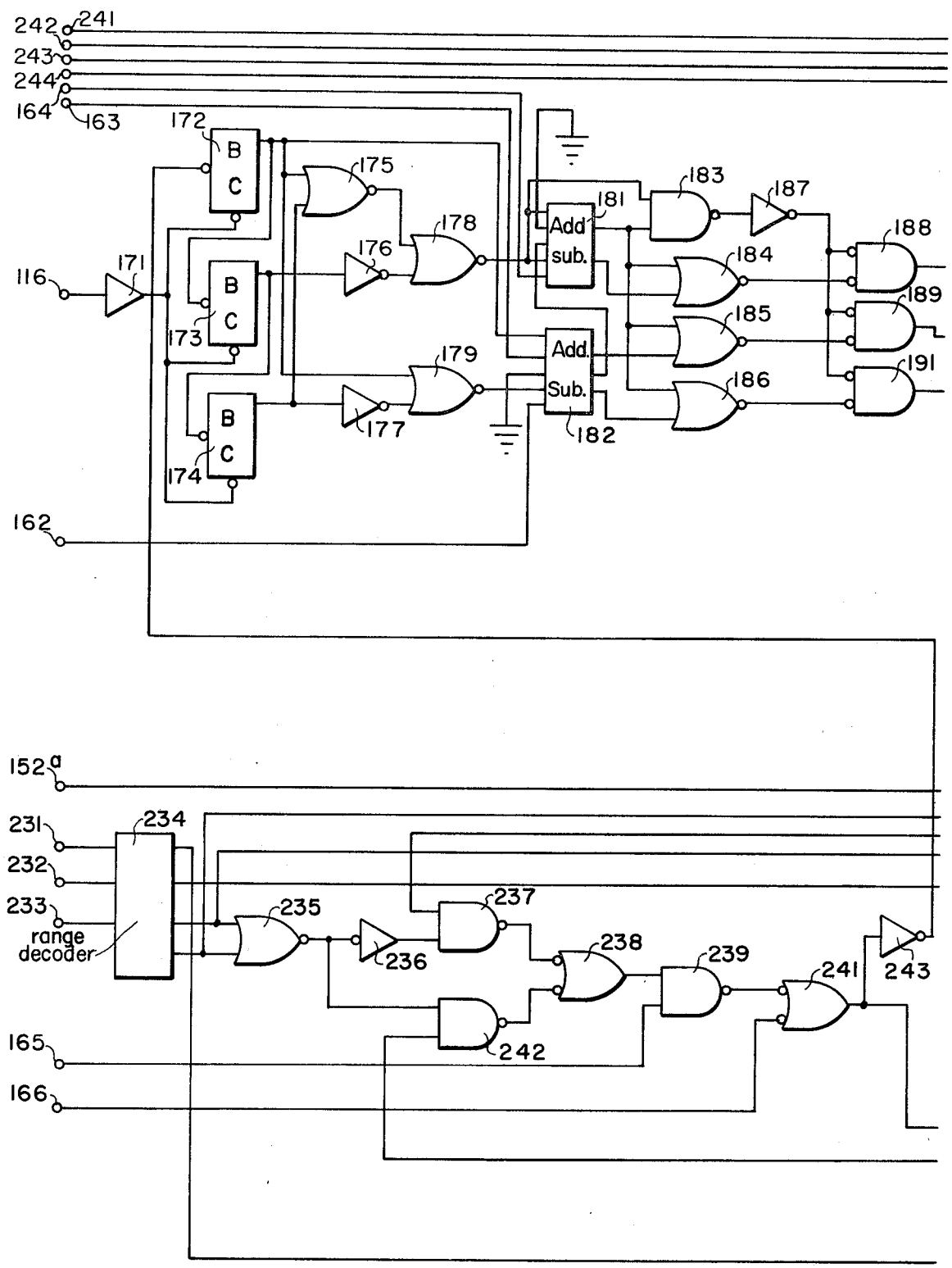

COLLISION AVOIDANCE RADAR SIMULATOR SYSTEM

RELATED APPLICATIONS AND PATENTS

This invention is an improvement over the invention disclosed in U.S. Pat. No. 3,514,521, issued on May 26, 1970, to W. K. Burchard et al.

BACKGROUND OF THE INVENTION

1. Field of Invention

This invention relates to training systems, and more particularly to systems for simulating operative radar apparatus.

2. Description of Prior Art

Radar simulation goes back in time almost to the time of the earliest radar equipment. Early radar simulators used radar maps which were scanned by beams of light and projected onto suitable screens. Later models of radar simulators used specially prepared photographic transparencies through which the light from a flying spot scanner was passed. The trainee and the instructor controlled the area of the transparency which was displayed at any time. The light, modulated by the density of the transparency, was translated into electrical energy which was used to control the beam intensity of a cathode ray tube display. These systems were analog in nature and were not easily changed. For educating personnel in the basic uses and operation of radar systems, the prior art devices were suitable. As training requirements increased to include the training of officers in the operation and reading of radar displays for operation of a ship, the use of digital computers for such simulators became more and more feasible. Analog devices are not easily changed, the photographic transparencies used for radar simulation are expensive, and when major changes in the radar targets in an area change, the transparencies are not easily modified. Digital computers, however, have the happy characteristic of readily changeable programs. When information which represents the radar targets in a specified area is stored in the memory of a digital computer, that information can be printed out, changed where changes are required, and reinserted into memory with little trouble or expense. In fact, in one radar simulator which was programmed to display the entrance to Chesapeake Bay, the program was changed with little effort to show the break in the Chesapeake Bay Bridge when that bridge was damaged in a severe storm. After the repairs to the bridge had been made, the program was again changed to show the bridge unbroken. This type of rapid and inexpensive change to the information being displayed on the radar screen is not readily achievable with equipment other than that utilizing digital computers.

The system described in U.S. Pat. No. 3,514,521, issued on May 26, 1970, to W. K. Burchard et al. describes a radar simulator using a digital computer. But the system of the Burchard et al. patent has limited capabilities. In the patented system, two own ships are handled by the apparatus at any time. The entire gaming area is limited in size to an area about 64 miles by 64 miles. and only one harbor area can be stored at any time for both own ships. The single computer used in the patented system handles the conversion of the data from ractangular to polar coordinates, the navigational computations necessary to locate both of the own ships and the moving targets, and the movements of the two own ships themselves. The system of this invention is designed to decrease the loading on the computer so that the system has substantially greater capabilities than that of the patented system.

SUMMARY OF THE INVENTION

It is an object of this invention to provide a new and improved digital data system.

It is another object of this invention to provide a new and improved system for providing a readily controlled display from digital data.

It is still another object of this invention to provide a new and improved training system.

It is yet another object of this invention to provide a new and improved radar training system.

It is still a further object of this invention to provide a new and improved marine radar simulator for simulating the operation of standard radar equipment in a predetermined gaming area.

Other objects and advantages of this invention will become more apparent as the following description proceeds, which description should be considered together with the accompanying drawings.

BRIEF DESCRIPTION OF THE DRAWINGS

FIG. 3 is a logical block diagram of a portion of the interface of FIG. 2 which is common to all own ships;

FIGS. 4A and 4B comprise a logical block diagram of a portion of the interface of FIG. 2 which is typical for all own ships; and FIGS. 5A and 5B comprise a logical block and schematic circuit diagram of the video portion of the system of FIG. 2.

DESCRIPTION OF THE PREFERRED EMBODIMENT

Figure 1:
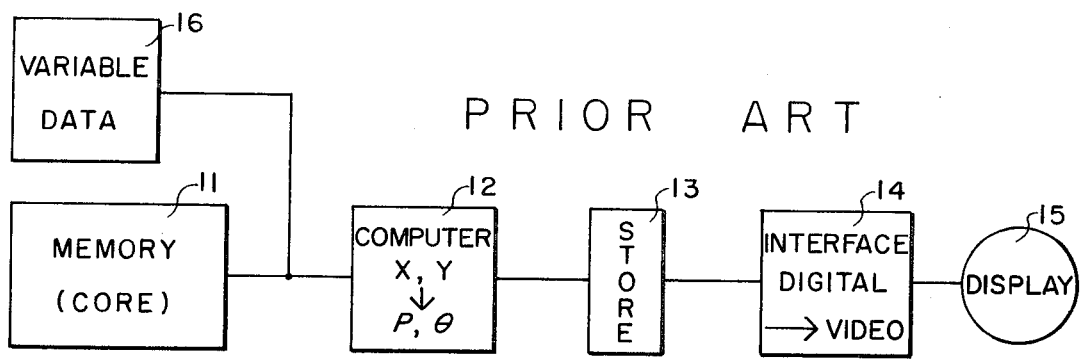
FIG. 1 is a simplified block diagram of a prior art system.

Referring now to the drawings in detail and in particular to FIG. 1; the reference character 11 designates a computer memory whose output is connected to a computer 12. Also connected to the input of the computer 12 is a source 16 of variable data. The output of the computer 12 is connected to a store 13, and the output of the store 13 is connected to the input of an interface 14. A standard radar display 15 is connected to the output of the interface 14.

The apparatus shown in FIG. 1 represents a very broad overall block diagram of an older radar training system described in the above-mentioned patent. In that system, information representing the radar targets of all sorts which are located within the specified gaming area is stored in the memory 11. Initially, the entire gaming area is described in terms of XY coordinates, or, if desired, latitude and longitude. Assuming for this discussion, however, that each radar reflecting point is identified in the memory by its XY coordinates (and by some information which represents intensity) then, given the XY coordinates of a ship, the computation of the range and bearing from that ship to each of those radar reflecting points readily can be computed. The location of the own ship (an own ship is the ship which carries the radar equipment being simulated) is inserted in XY coordinates into the computer 12 from the source 16 by the instructor or other operating personnel. In addition, information representing the heading and the speed of the own ship can also be inserted from the source 16. With the XY position of the ship at any instant known, the information which represents the XY positions of each of the radar reflecting points whose information is stored in the memory 11 is compared with the same information of the ship, and the bearing from the ship to the point and its range are also computed. The information representing radar reflecting points along any particular bearing line of the ship's radar antenna is arranged in the order of increasing range from the ship. This information, which represents all of the radar reflecting points contained within a 1° segment in the direction in which the ship's radar antenna is pointing, is stored in the store 13. The interface 14 withdraws that information as it is required and converts the digital information representing the range of the point and its intensity into video signals. These video signals are then applied to the radar display 15 to control that display. Each 1° of rotation of the ship's radar antenna brings forth a new set of radar information from the computer 12 to the store 13. Thus, as time progresses, a complete plan position indication of the area surrounding the ship is presented on the radar display 15. In addition to this, the position of the radar antenna and the position of the radial sweep of the beam in the radar display 15 are synchronized by appropriate equipment.

The system briefly discussed in FIG. 1 has been constructed, and it operates quite well. That system requires a substantial amount of computer storage and computer time, and it can, therefore, display information for only two own ships. In addition, both of the ships must be within the same gaming area which is an area roughly 64 miles by 64 miles. The two ships need not be in the same position in the gaming area, nor moving at the same speeds. But the amount of information which can be stored and displayed in the system of FIG. 1 is limited.

Figure 2:
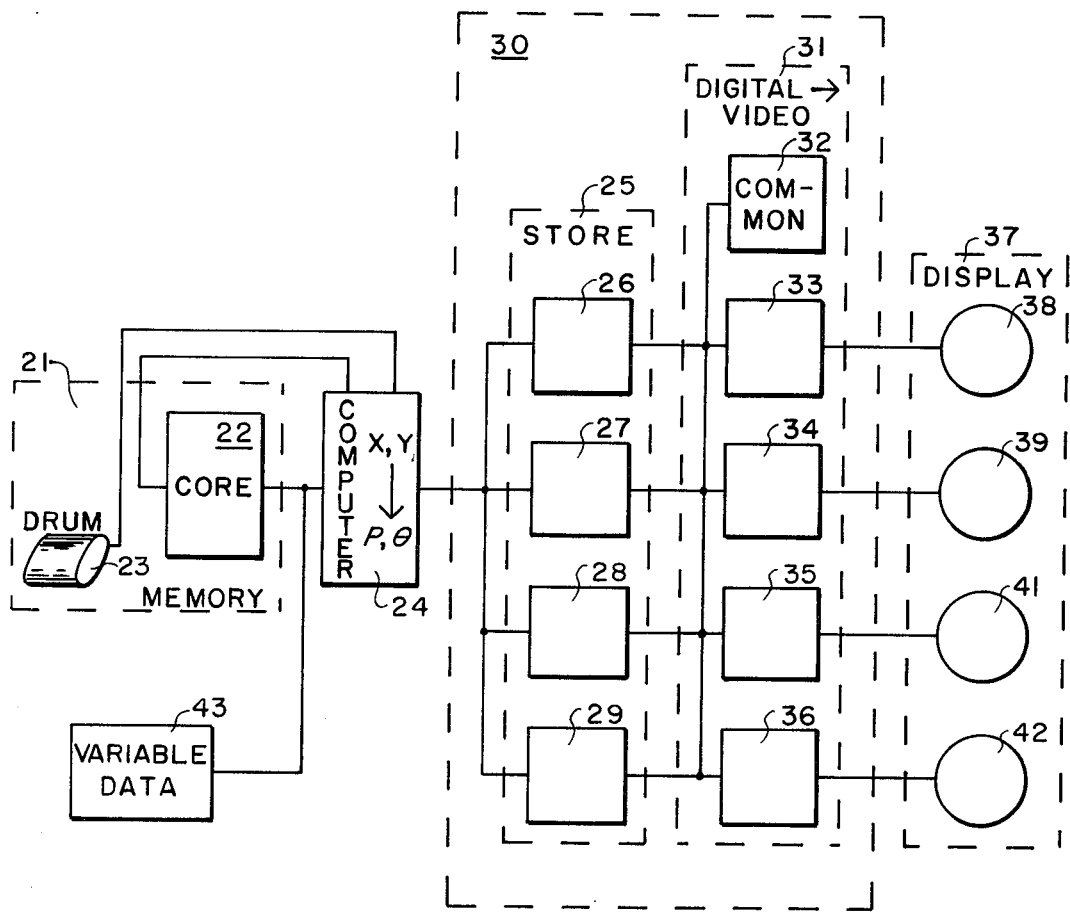
FIG. 2 is a simplified block diagram of one embodiment of a system which incorporates the principles of this invention.

The system of FIG. 2 is a much more ambitious system which permits the use of eight own ships simultaneously and might well store information representing radar targets in the entire world. In the system of FIG. 2, the reference character 21 designates a computer memory which comprises a magnetic drum 23 and a magnetic core array 22. Both the core array 22 and the drum 23 are accessed for writing and reading by a computer 24. A source 43 of variable data is also connected to the computer 24. The output of the computer 24 is applied to a radar interface 30 which includes a plurality 25 of individual stores 26, 27, 28, and 29. Each of the individual stores 26–29 has its own output, and all of the outputs are applied as inputs to a digital-to-video converter 31. Within the digital-to-video converter 31 is a common portion 32 which contains controls and signal generators common to all of the individual units. In addition, within the digital-to-video converter 31 are a plurality of individual memory registers 33, 34, 35, and 36, and other control circuitry 32. Each of the registers 33–36 has its own output which is connected to a radar display 38, 39, 41, or 42 contained within a bank 37 of displays.

The system of FIG. 2 is designed to be more versatile and to operate more displays than that of FIG. 1. To accomplish this, information representing radar reflective targets over a wide portion of the surface of the earth is stored on the magnetic drum in the form of XY addresses for each point of radar information. The radar information is further divided into subsets. Each subset contains information which can be seen by the radar on a ship which is any where within that subset. In order to accomplish this, some of the radar information which is stored is duplicated, but the savings in time of recovery and simplification of the overall system is well worth the additional storage space that is required. When an instructor inserts into the computer 24, from the source of variable data 43, XY information defining the present position of an own ship, the computer 24 begins searching the information on the drum 23. The X and the Y ranges or limits of each subset are made available to the computer 24, and when the ship's location is found to be within one set of those ranges, the subset identified thereby is read from the drum 23 and is stored in the core 22. Utilizing the XY position of the ship and the XY positions of each item of radar reflective information stored in the core array 22, the computer 24 converts all of that information into polar coordinates and then arranges that information in a particular store 26–29 by bearing and increasing range along that bearing. The bearing width in the system of FIG. 2 can be in the order of 1° or less. In the apparatus actually constructed, a bearing segment was defined as 0.7°. With the information of particular subsets of information stored in the stores 26–29, it is a relatively simple matter for the information representing all of the targets along a single radial sweep to be transferred from a single store, say the store 26, into a particular register 33 in the digital-to-video converter 31. At this point, all of the targets along a single sweep for a single own ship are stored in the register 33. This information is then converted into video form and is applied to the radar display 38. Shown in FIG. 2 are four stores 26, 27, 28, and 29 for four own ships. In a similar manner, FIG. 2 shows four registers 33–36 and four radar displays 38–42. One combination of a store 26, register 33, and display 38 is associated with a single own ship. Another combination of store 27, register 34, and display 39, for example, are used for a second own ship. And so on. The utilization of four separate chains of equipment in the interface 30 and the display 37 together with the separate stores 26–29 enables a single computer 24 and a single core array 22 to be used for all of the displays. Once the computer 42 has converted all of the radar target information contained in the core array 22 into polar coordinates and has transferred that information into the particular store 26–29 for which it is intended, the array 22 is cleared and the subset for the next own ship is read from the drum 23 and is written into the core array 22. The computer 24 then proceedes to convert the information now stored in the core array 22 into radar information in polar coordinates and to transfer that information to the next store 27. Once this has been accomplished, core 22 is again erased, the next subset of information for the next own ship is read from the drum 23, transferred into the core array 22, and the entire procedure repeats itself. This means that the computer 24 is scanning the drum 23 to locate a plurality of different subsets for a plurality of different ships, transfers each subset as it is found into the core array 22, converts the information stored in the core array 22 from rectangular coordinates to polar coordinates, and transfers that information into the appropriate store 26–29. The computer 24 is rather busy, and in the device actually constructed, three computers were used for this purpose. In the device constructed, eight own ships are displayed and the information stored on the drum 23 covers a substantial portion of the entire globe.

To avoid enlarging this specification beyond all reasonable bounds, only those portions of the entire system which are new will be described in detail. The location of an appropriate section of information stored on the drum 23 is not new. The transfer of that information from the drum 23 to the magnetic core array 22 is not new. The computations of polar coordinate information from rectangular coordinate information is not new. And the storing of the converted information into the individual stores 26–29 is not new.

FIG. 3 is a logical block diagram of much of the circuitry which is contained in the common block 32 of FIG. 2. An input terminal 50 is adapted to be connected to the computer 24 to receive information therefrom and is connected to a register 51. The output of the register 51 is connected in parallel to a counter 52 by means of wires 53. The count input of the counter 52 is connected to a 1 mHz clock 54, and the count output of the counter 52 is applied to one input of a NOR gate 55 whose output is applied to the set input of a flip-flop 56. The set output of the flip-flop 56 is connected to one input of an AND gate 57 whose output is connected to an output terminal 58. An antenna simulator 71 has an output which is connected to the restore input of a flip-flop 72. The set output of the flip-flop 72 is applied as a second input to the NOR gate 55. The restore output of the flip-flop 72 is applied as one input to a NAND gate 73 whose output supplies an output terminal 74 which is connected to the computer. The second input to the gate 73 and the restore input to flip-flop 56 comes from an input terminal 75 which is connected to a computer output and which tests the gate 73 for the presence of a 0° signal from the antenna simulator 71. An update control terminal 81 is connected to the input of a NOR gate 82 which is connected with a second NOR gate 83 into a latching circuit. The output of the circuit is taken from the output of the gate 83 and is applied as one input to an AND gate 84. The terminal 81 is also connected to the count input of a counter 87 which has a plurality of outputs connected to decoding circuits 88 and 89. Each of the decoding circuits 88 and 89 has eight outputs 93 and 94, each of which represents one own ship. Output terminal 95 represents the first own ship from the decoder 88 and the output 96 represents the first own ship from the decoder 89. One of the outputs from the counter 87 is applied as one input to a NAND gate 91 whose output supplies the decoder 88, and a second output of the counter 87 is applied to a NAND gate 92 whose output supplies the decoder 89. The terminal 81 is also connected to the clock input of a flip-flop 62 which has its set and restore inputs tied together and to a computer input terminal 61. A positive potential is applied to the terminal 61 by the computer. The set output from the flip-flop 62, which is connected as a binary counter stage, is applied as one input to a NAND gate 63, and the restore output from the flip-flop 62 is applied as one input to a NAND gate 64. The second inputs to both of the gates 63 and 64 are supplied from the set output of a flip-flop 85. The set input to the flip-flop 85 is connected to the output from the latch circuit formed by the gates 82 and 83, and the restore input of the flip-flop 85 is connected to an input terminal 86 to which the radar trigger signal is supplied. The set output of the flip-flop 85 is also applied to a second input to the gate 84. The output from the gate 63 is applied as the second input to the gate 92 and as one input to a NAND gate 65. The output from the gate 64 is applied as a second input to the gate 91 and as one input to a NAND gate 66. The output gates 65 and 66 are connected to output terminals 101 and 102. An input terminal 47 is adapted to receive an end of data transfer input from the computer and to apply the signal to one input of a NAND gate 67. A terminal 48 which receives a selection signal from the computer applies that signal to the second input to the gate 67 and to one input of a NAND gate 97. The output from the gate 67 is applied to one input of a NOR gate 68 whose output is applied to one input of the gate 83. The other input to the gate 68 comes from a master clear terminal 49 which is also connected to clear the flip-flop 85 and the binary counter 62. The input terminal 61 from the computer is also connected to a second input of the gate 97 and to the flip-flop 85. The output of the gate 97 is applied to the set input of the one shot 98 whose unstable output is applied as one input to a NAND gate 99 and as an input to the counter 87. The other input to the gate 99 as well as one input to a NAND gate 103 is connected to the computer input terminal 61. The output of the gate 99 supplies a second input to the gate 103 whose output is connected to the enable output terminal 104.

When the system is first started, the computer 24 applies a word to the input terminal 50 to load the register with a word which defines the update interval of the system. The output of the register 51 is applied through lines 53 in parallel to the input of the counter 52. The clock 54 supplies pulses at the rate of 1,000,000 per second to the counter 52 which counts from the base of the word supplied to it from the register 51 to its overflow condition if it is an up-counting counter or to its zero position if it is a down-counting counter. When the counter reaches zero or an overflow, it applies a signal through the gate 55 to set the flip-flop 56. This applies a signal to the gate 57, to apply its output on the terminal 58 and apply a second input to the computer 24, and serves to indicate that a new sweep is about to begin. The Master Clear from the computer is initially applied to the input terminal 49 to restore the binary counter 62 and the flip-flop 85. It is also applied through the gate 58 to the input of gate 83 to clear the latch circuit. Subsequently, with a signal applied to the input terminal 48 whenever a strobe signal is applied from the computer to the terminal 47, a signal passes through the gate 67 and the gate 68 to clear the latch circuit 82–83. Systems in which information is transferring to and from a computer usually contain what is called a "handshake" circuit. A ready signal is applied to terminal 81 signifying that the computer is ready to transfer data. This is stored in the latch 82–83. When the next sweep trigger pulse is applied to terminal 86, the flip-flop 85 is set, and the gate 84 opens to apply a start transfer signal to terminal 105. This is applied to the computer which begins to transfer data to the registers 33–36. The signal applied to terminal 48 is applied to gate 97 and indicates that this particular register is to receive data. One shot 98 is set by the output of gate 97, and the set output of the one shot 98 is the data load signal on terminal 104. When the computer has transferred the data for that one sweep, it applies an end of data signal to terminal 47. Gate 67 opens and applies a reset signal to the latch 82–83 which removes one signal from the gate 84, and the update is over. This is a typical example of the procedures followed in transferring information in and out of a computer. The counter 87 serves as a multiplexing counter, and three of its outputs are applied to the decoding circuits 88 and 89 simultaneously to step the energization of the output lines 93 and 94 so that information from the computer is sequentially applied to the appropriate store for that own ship. Whenever the one shot 98 is set, it generates an enable signal and it also applies a signal to the counter 87 to restore that counter to zero. The counter 87 counts the number of update signals which the computer 24 applies to the input terminal 81. Each time an update signal is applied to the terminal 81 by the computer 24, the binary counter 62 is has stepped to its next position, the latch circuit 82–83 is set, and the counter 87 counts to a new count. Consider each of these in turn. As the counter 87 counts, its output lines are energized in a pattern. This pattern is translated by the decoders 88 and 89 into energization of the individual output terminals 93, 94, 95, and 96. For each count of the counter 87, one of the output terminals 93 or 95 and the corresponding output terminals 94 and 96 will be simultaneously energized or selected. The signals passed by the gates 91 and 92 determine which one of the pair of output terminals will be energized. The opening of gate 91 or 92 depends upon the counter 87 reaching a prescribed count and also depends upon which of the two gates 63 or 64 opens to pass a signal. That in turn depends upon which output of the binary counter 62 is energized as the counter is driven into its alternate states by the update signal applied by the computer 24 to the terminal 81. Each time an update signal is applied to the terminal 81, the binary counter 62 is driven into the other of its two states. This alternately opens the gates 63 and 64, to alternately open the gates 92 and 91, to alternately energize the outputs of the decoders 88 or 89. It also determines which of the two gates 65 or 66 will be open at any instant. Periodically, the computer applies a signal to terminal 75 to test if the antenna simulator 71 is at 0°. This signal restores the flip-flop 56 to remove the output signal at terminal 58.

In recapulation of the above description, the update timing interval of the system is determined by a computer word which is inserted from the computer through the input terminal 50 into the register 51. This preloads the counter 52, and the clock 54 supplies pulses to the counter 52 at regular intervals. The word which is initially loaded into the counter 52 determines the length of time it takes the counter to reach its zero count or overflow. When that occurs, a pulse is sent to the computer through the output terminal 58 to indicate to the computer that it is time to update, and additional information then can be transferred into the interface. The update interval is determined by the resolution required of the system and the amount of computer time available to handle updating. This is inherent in the design of the system, and once it has been determined it is not usually changed unless major changes are made in the system itself. The update timing is controlled by a clock in the interface; the computer computations are controlled by a clock in the computer. Obviously, the components of the system must be synchronized with each other. One manner in which this is accomplished is by means of the 0° antenna signal. In a radar system, a pulse is transmitted into space in a prescribed direction by an antenna having a very narrow beam width. Each time a pulse is transmitted by the antenna, a radial sweep on the display is initiated. The sweep on the face of the display is coordinated with the position of the antenna so that when the radar pulse transmitted by the antenna is reflected by objects in the distance, and the reflected signals are received, these reflected signals can be displayed and they will bear a realistic relationship with the radar antenna itself. The rotation of the radar antenna in this system is simulated by the antenna circuit 71 in FIG. 3. The details of the device which simulates the antenna are not necessary to this description, but that device may be a very accurate clock which transmits a 0° signal at precise intervals, or it may be a rotating shaft driven by the same device which drives the coil in the radar unit itself. The rotating shaft may be indexed to produce a suitable pulse by mechanical switching means, by optical means, or by electrical means. In any of these cases, the result is the same. When the 0° position of the simulated antenna is reached, a pulse is generated and is transmitted through gate 73 and terminal 74 to the computer to synchronize the computer at that instant.

As indicated above, when a pulse is transmitted by the radar antenna, a new radial sweep is initiated in the display. In the apparatus of this invention, the act of transmitting that radar signal must be simulated. This is accomplished by producing a trigger pulse which is applied to the input terminal 86. Again, the manner in which this particular pulse is produced is not material to an understanding of this system. This trigger pulse may be produced by an accurately running clock; it may be produced by the rotation of the shaft which simulates the antenna if such a shaft is used; or it may be produced by the computer itself. In addition, there are undoubtedly many other ways in which a trigger pulse which occurs at precise intervals may be produced. The occurrence of that trigger pulse signals the beginning of a new cycle of radar events. That trigger pulse is applied to the flip-flop 85 to begin the operation of the simulated radar cycle. As indicated above, this system simulates the operation of a plurality of own ships, each operating in its own portion of the world's oceans, each at its own speed and in its own direction, and each under the control of its own trainee-operator. In order to accomplish this simulation of a plurality of different ships on different simulated missions, the utilization of the portion of the apparatus which is common to all is multiplexed. That is, the common apparatus is used to initiate the operation of a cycle or a fixed number of cycles for one own ship, and then it is switched to accomplish the same function for another own ship. That multiplexing continues so that each of the own ships has its cyclic operation initiated in sequence. This cyclic operation was outlined above in the discussion of FIG. 2.

The information representing that portion of the gaming area in which a ship is located and which is within the range of its radar system is stored in the individual stores 26–29 shown in FIG. 2. During the interval of time between successive transfers of information into the individual stores, the system unique to each of the ships is operated from the contents of its store. Information representing a single segment in the radar range of the ship is transferred from the individual store to appropriate registers for conversion from digital form into video form for application to the display. This information can be considered the information recovered by a radar system from a single pulse transmission. Duplicate registers are used in this system for this single segment of information so that one register is always available for reading while the other can be reloaded. This, of course, provides continuity of operation and does not interrupt the display. Therefore, in addition to the multiplexing to store the information for each own ship, the register being loaded at any time must also be selected. The multiplexing is accomplished by the counter 87 which counts each time an update signal is applied to the input terminal 81 by the computer. The count output from the counter 87 is decoded into eight signal lines by each of the decoders 88 and 89. Since the decoders 88 and 89 are identical, the same corresponding output line is selected by both. The further selection of one of the two registers for that own ship to be updated is determined by the flip-flop 62 which is connected as a binary counter stage. The flip-flop 62 also receives at its input the update signal applied to the terminal 81, and each time this signal is applied to the flip-flop 62, that flip-flop is switched to its other condition. By means of a plurality of gates, including the gates 91 and 92, this alternating of the outputs of the flip-flop 62 alternately selects the decoding unit 88 or the unit 89.

Figure 4A:
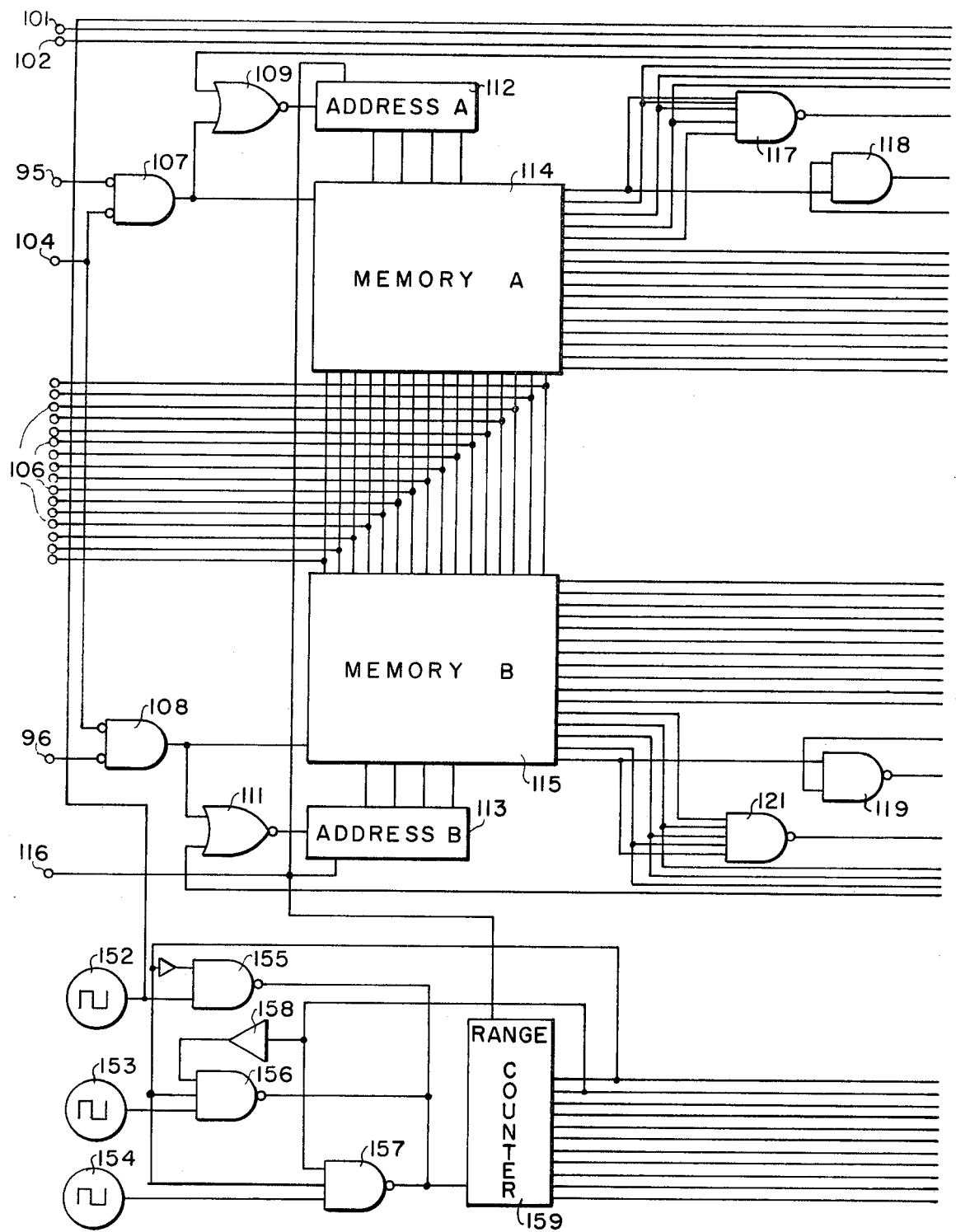

FIGS. 4A and 4B comprise a logical block diagram of some of the apparatus in the individual interface units. Each interface unit for one of the own ships comprises an A memory 114 and a B memory 115. Digital information representing radar reflective information along an arc in the neighborhood of 0.7° are supplied by the computer or other information transfer unit from the appropriate store 26–29 to the input terminals 106. The terminals 106 are connected to both memories 114 and 115. The memory 114 has an addressing counter 112. The input to the addressing counter 112 is the output of a NOR gate 109 which receives one input from the output of a NAND gate 107. The gate 107 has one input connected to the terminal 95 which is the output terminal from the decoder 88 of FIG. 3, and a second input connected to the enable terminal 104. The terminal 104 is also connected as one input to a NAND gate 108 which has its second input connected to the input terminal 96. Terminal 96 is the output terminal for the own ship of the decoder 89 of FIG. 3. The output of the gate 108 is applied to the memory 115 and also as an input to a NOR gate 111. The output of the gate 111 is connected to the input of an addressing unit 113 which is connected to the memory 115. The terminal 116 receives the trigger input which also was applied to the terminal 86 in FIG. 3. The input terminal 101 is connected as one input to a NAND gate 126, the output of which serves as one input to a NAND gate 127, and through an inverter 161 as the set input to a flip-flop 136. The terminal 102 is connected as one input to a NAND gate 128, the output of which is connected as one input to a NAND gate 129. The output of the gate 127 is connected as a second input to the gate 109 and also as one input to a NAND gate 118. The output of the gate 129 is connected as a second input to the gate 111 and also as one input to a NAND gate 119.

The memories 114 and 115 each contain 16 words of 16 bits each. The output of each of the memories 114 and 115 is a single word of sixteen bits in parallel. Eleven of these output lines from the memory 114 are connected as inputs to a comparator 123, and eleven of the output lines from the memory 115 are connected as inputs to a comparator 124. The five additional outputs from the memory 114 are connected as inputs to a NAND gate 117, and the five remaining outputs from the memory 115 are connected as inputs to a NAND gate 121. Three of those five outputs from the memory 114 are individually connected to the individual inputs of NAND gate 138 and to the AND gates 141, and 143; and three of those five outputs from the memory 115 are connected as individual inputs to AND gate 144, AND gate 142, and NAND gate 139. The two comparators 123 and 124 also receive as inputs the eleven outputs from the range counter 159. The range counter 159 has applied to its counting input the outputs from a clock 152 applied through a NAND gate 155, a clock 153 applied through its NAND gate 156, and a clock 154 applied through its NAND gate 157. A second input to each of the gates 155, 156, and 157 comes from the least significant digit output of the counter 159. A third input to the gate 157 is received directly from the second least significant output of the counter 159, and this output is also applied through an inverter 158 as the third input to gate 156. The outputs of the gates 155, 156, and 157 are connected together. In addition, the output of the clock 152 is also applied as a second input signal to the gate 127 and as a second input to the gate 129 as well as one input signal to a NAND gate 135. The output from the comparator 123 is applied as a second input to the gate 126, and the output of the comparator 124 is applied as the second input to the gate 128. The second input to gate 118 comes from one output line of the memory 114, and the output of the gate 118 is applied to the restore input of a flip-flop 122. The set input of the flip-flop 122 is connected to the output of the gate 117. The output of the gate 119 is connected to the restore input of a flip-flop 125 whose set input is connected to the output of the gate 121. The output of the gate 117 is also applied as one input to a NAND gate 131, and the output of the gate 121 is also applied as an input to a NAND gate 132. The outputs from the gates 131 and 132 are applied as inputs to a NOR gate 134 whose output is the other input to the gate 135. The restore output from the flip-flop 122 is applied simultaneously to a second input of the gate 131, and to one input of a NOR gate 133. The restore output of the flipflop 125 is supplied as the third input to the gate 132, and as a second input to the gate 133. The restore output of the flip-flop 136 is connected as a second input to each of the gates 139, 142, and 144. The set output from the flip-flop 136 is connected as a second input to each of the gates 138, 141, and 143. The outputs from the gates 138 and 139 are connected as the two inputs to a NOR gate 145. The outputs from the two gates 141 and 142 are connected as the two inputs to a NOR gate 146. The outputs from the two gates 143 and 144 are connected as the two inputs to a NOR gate 147. The output from the gate 145 is applied to the set input of a flip-flop 148; the output from the gate 146 is applied as a set input to a flip-flop 149; and the output from the gate 147 is applied as a set input to a flip-flop 151. The output from the gate 135 is directly applied as a restore input to the flip-flop 136 and through an inverter 137 as the restore inputs to the flip-flops 148, 149, and 151.

The equipment shown in FIGS. 4A and B is duplicated for each of the own ships. This is the equipment which provides the system with the information required to display a complete sweep on the display for that own ship and with the controls for implementing the display of that information. Referring to both FIGS. 3, 4A and 4B, when the update signal is generated on terminal 58, the apparatus shown on FIG. 3 operates in the manner indicated above to cause the energization of individual lines or output terminals from the decoders 88 and 89 as well as one of the two output terminals 101 or 102. Consider for this discussion that output terminal 101 and terminal 95 have been energized. A signal applied to terminal 95 provides a conditioning signal for the gate 107 which opens to pass the enabling signal from terminal 104. The output from the gate 107 passes through the gate 109 to clear the address counter 112. At the same time, the output terminal 105 (FIG. 3) has been energized to cause the computer to transfer sixteen words of sixteen bits each in parallel to the terminals 106. The output of gate 107 also clears the memory 114 and opens it to receive the information from the computer. Once the memory 114 has been filled, the address in the counter 112 has been set to zero. Initially, the range counter 159 counts at the rate of 4 mHz which is the output from the clock 152. This means that initially gate 155 is open and gates 156 and 157 are closed. As the range counter 159 counts, its output indicates the range of a target that would be displayed if its pulse had been returned at that point in time. The information that is stored in the memory 114 comprises 16 words. Each word includes 11 bits which identify the range of the particular target, 3 bits which indicate the value of the radar reflective intensity of the return pulse, and 2 bits which are used for control purposes. Of the 11 bits which indicate range, the 10th bit is applied directly to one input of gate 157 and through inverter to one input of gate 156, and the 11th bit is applied directly to gates 156 and 157 and through an inverter to gate 155. The frequency of the clock 152 is high, that of clock 153 is intermediate, and that of clock 154 is low. Whenever the eleventh count is not present, gate 155 is open and gates 156 and 157 are closed. When the eleventh count is present and the tenth count is not, gate 156 only is open. And when the tenth and eleventh counts are both present, gate 157 is open. This provides a slower count for the greater ranges to keep the number of binary digits to 11 and maintains the high resolution required for close ranges. The 11 bits which represent the range are applied to one input of the comparator 123; and, at the same time, the output of the range counter 159 is applied to the other input of the comparator 123. The output of the range counter 159 is also applied to the input of the comparator 124, but the operation of that comparator and of the memory 115 is the same as that being discussed and will not be discussed in detail. When the comparator 123 finds a correspondence between the range information it receives from the memory 114 and the contents of the range counter 159, it transmits a compare signal. This compare signal is applied as one input to the gate 126 and is used to produce several results.

It is at this point that the selection of the contents of memory 114 or 115 is made. As indicated above, the contents of memory 114 are applied to one side of the comparator 123 and the contents of the memory 115 are, at the same time, applied to one side of the comparator 124. The output from the range counter 159 is applied simultaneously to the other sides of both comparators 123 and 124. Presumably, both comparators 123 and 124 can simultaneously generate output signals. The output from the comparator 124 is applied to gate 128. The other input to gate 128 comes from the input terminal 102. The output from the comparator 123 is applied to gate 126, and the other input to this gate comes from terminal 101. The update circuit for memories 114 and 115 comprises gates 63, 64, 65, and 66 together with the other circuitry shown in FIG. 3. This circuitry also determines which of the two terminals 101 and 102 is energized in any moment.

As indicated above, the 16 bits which comprise each word in each of the two memories 114 and 115 include 2 bits which are control bits and indicate the type of information which is to be displayed. There are four types of information:

1. Plain Video—This will appear as one spot on the screen.
2. Start Line Video—This initiates a continuous string of pulses displayed along that radial of the display being generated.
3. Stop Line (No Video)—This indicates when the line started by (2) above stops.
4. No Video—This generates no display but can generate an inhibit signal for control purposes.

The control bits of words in the memory 114 are applied to the inputs of the gates 117 and 118. The control bits of the words in the memory 115 are applied to the gates 119 and 121. The output from the gate 118 is applied to the restore input of the flip-flop 122, and the restore output of the flip-flop 122 is applied through the OR gate 133 to indicate on terminal 165 the existence of the type of information set forth in (2) above. In a similar manner, the output of the gate 119 is applied to the restore input of flip-flop 125 whose restore output is applied to the terminal 165 to indicate type (2) information. The restore output of the flip-flop 122 is also applied as one input to the gate 131; and the restore output from the flip-flop 125 is also applied as one input to the gate 132. Since the operation of these gates is essentially the same, only one of the gates will be considered. A second input to gate 131, for example, comes from the output of gate 127 which indicates the occurrence of an "event." In this discussion, an event occurs whenever there is a comparison output produced by the comparators 123 and 124. The third input to the gate 131 comes from the output of the gate 117 which indicates the existence of either of two conditions set forth above. Whenever any of the inputs to gate 117 are low, the output of gate 117 is high. When all of the inputs to gate 117 are high, the output of gate 117 is low. This means that gate 131 will receive an output from gate 117 unless all of its inputs are high. When the outputs of both gates 117 and 118 are high, type (2) information above is indicated. In addition, terminal 166 receives an output signal through gates 134 and 135 to indicate the occurrence of an event. If the output of gate 118 only is high but the output of gate 117 is low, the type (2) information is no longer generated; and terminal 166 is not enabled to indicate "no event." The various codes have weighted priorities. The first priority signal is the type (3) information; the second priority signal is the type (2) information; the third priority signal is the type (1) information; and the fourth priority signal is the type (4) information. Whenever comparator 123 generates an output signal which passes through the gate 126, that signal is inverted in an inverter 161 and is applied to the set input of the flip-flop 136. Whenever an event occurs on the output terminal 166, it is applied to the restore input of the flip-flop 136. The set output of the flip-flop 136 is applied as one input to the gates 138, 141, and 143. The restore output from the flip-flop 136 is applied as one input to the gates 139, 142, and 144. Gates 138, 139, 141, 142, 143, and 144 decode the radar intensity bits contained in the words in the memories 114 and 115. Gates 139, 142, and 144 decode the information from memory 115, and gates 138, 141, and 143 decode the information from memory 114. The setting of the flip-flop 136 determines which of these two sets of gates is energized to pass the output signal. Thus, flip-flop 136 determines whether or not the video will be displayed from the memory 114 or from the memory 115. In addition to applying the range count to both of the comparators 123 and 124, the output from the range counter 159 is also applied to the input of a range decoder circuit 240. The decoder 240 has four output terminals 241, 242, 243, and 244; each of which represents a prescribed range point or distance from the antenna of the radar set. The decoder 240 may be of any standard type such as a plurality of gates, a matrix, or the like.

Figure 5B:
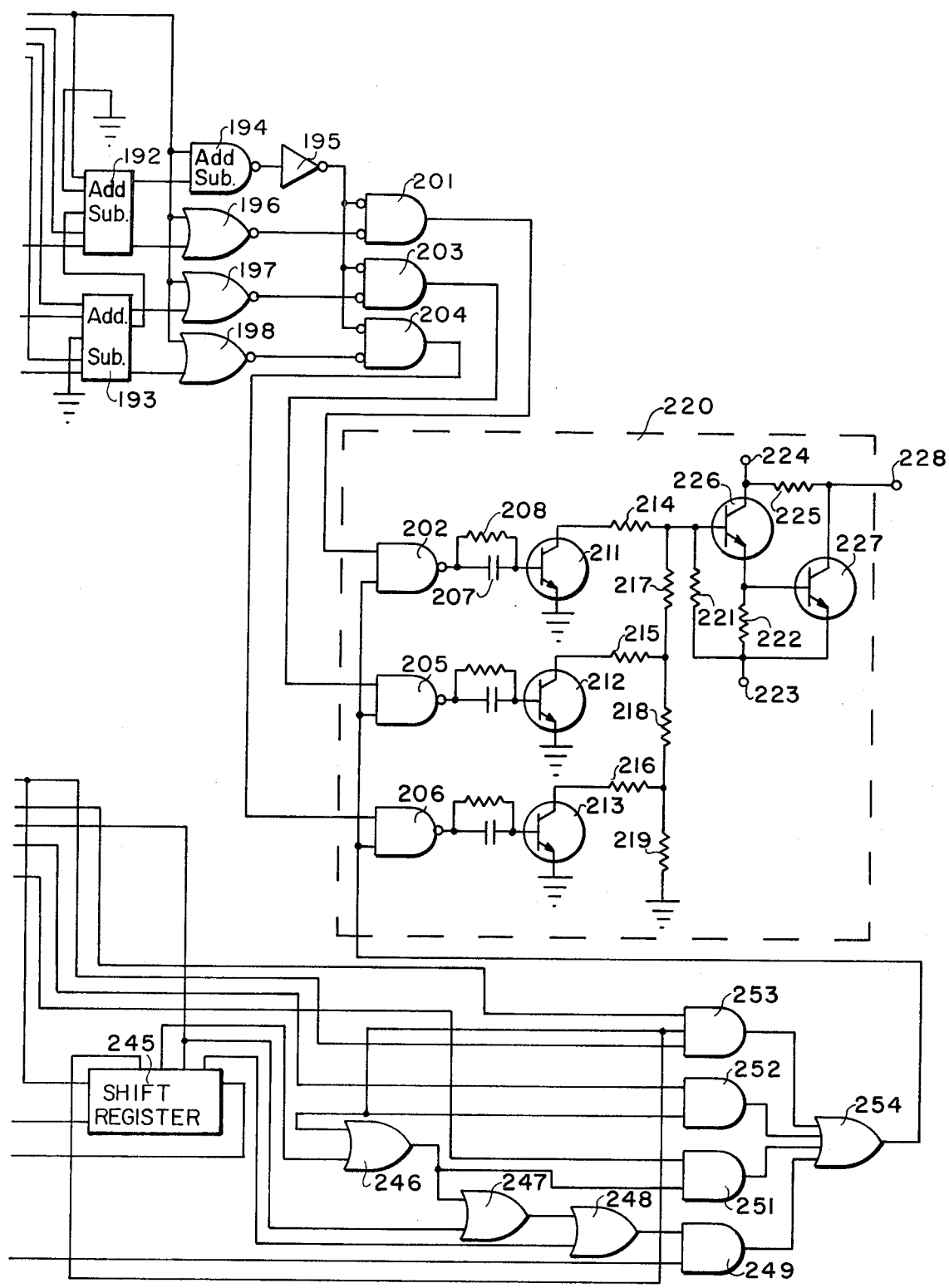

FIGS. 5A and 5B represent in logical block form equipment which is common to all of the own ships and which controls the video signals which are generated and displayed upon the radar display. A decoder 234 has three input terminals 231, 232, 233 applied to its input and has four output lines. One output from the decoder 234 is applied to one input of an AND gate 249 whose output is applied as one input to an OR gate 254. A second output from the decoder 234 is applied as one input to an AND gate 251 whose output supplies a second input to the gate 254. A third output from the decoder 234 is applied as one input to a NOR gate 235 and also as one input to an AND gate 252 whose output supplies a third input to the gate 254. The fourth output from the decoder 234 is applied as the second input to gate 235 and as one input to an AND gate 253 whose output supplies the fourth input to gate 254. The output from the gate 254 is applied to one input of each of three NAND gates 202, 205, and 206 in a sample D-to-A converter 220. The output from the gate 235 is applied through an inverter 236 to one input of a NAND gate 237 and directly to one input of a NAND gate 242. The outputs from the gates 237 and 242 are applied as two inputs to a NOR gate 238 whose output supplies one input to a NAND gate 239. The other input to the gate 239 comes from the terminal 165 which represents the beginning of a line generation. The output from the gate 239 is applied as one input to a NOR gate 241 whose second input comes from the terminal 166 which indicates the occurrence of an event. The output of the gate 241 is applied through an inverter 243 to the count input of a group of binary counters 172, 173, and 174. The output of the gate 241 is also applied to the load input of a shift register 245 which has its clock input connected to a terminal 152a from the 4 mHz clock. Shift register 245 has five outputs located at different digit positions in its shift path. The first output is connected to a second input to the gate 253, to the second input of the gate 252, and as one input to an OR gate 246. The output of the gate 246 is applied as a second input to the gate 251 and as one input to an OR gate 247. The output of the gate 247 is applied as one input to an OR gate 248 whose output supplies the second input to the gate 249. The second output from the register 245 is connected to the second input to the gate 246. The third output from the register 245 is connected to the second input of the gate 247 and to the second input of the gate 237. The fourth output from the register 245 is connected as the second input to the gate 248. The fifth output from the register 245 is connected as the second input to the gate 242.

A trigger input terminal 116 is connected through an inverter 171 to the clear inputs of each of the binary counters 172, 173, and 174. The count output from the counter 172 is connected to the count input of the counter 173, to the input of a NOR gate 175, to the input of a NOR gate 179, and to one of the add inputs of an adder-subtractor 182. The count output from the counter 173 is connected through an inverter 176 to an input of a NOR gate 178 and to the count input of the binary counter 174. The count output of the binary counter 174 is applied to the second input of the gate 175 and through an inverter 177 to the second input of the gate 179. The output from the gate 175 is applied to the second input of the gate 178 whose output is applied to two of the add inputs of an adder-subtractor 181 and to one input of a NAND gate 183. The output from the gate 179 is applied to one add input of the adder-subtractor 182. A second add input of the adder-subtractor 181 is grounded, and one carry input is not used. Another add input to the adder-subtractor 181 is connected to the terminal 164 which represents the output from the intensity storage device 148. The other carry input to the adder-subtractor 181 is connected to the second carry output of the adder-subtractor 182. A second add input to the adder-subtractor 182 is connected to the terminal 163 which represents the output from the intensity storage device 149. One carry input to the adder-subtractor 182 is not used and the other carry input is grounded. Another add input to the adder-subtractor 182 is connected to the terminal 162 which represents the output from the intensity storage device 151. Each adder-subtractor 181 and 182 comprises two separate units, each of which adds and subtracts depending upon its input signals, the sum two output from adder-subtractor 181 is applied as the second input to the gate 183, as one input to a NOR gate 184, as one input to a NOR gate 185, and as one input to a NOR gate 186. Both carry outputs from the adder-subtractor 181 are not used, and the sum one output is applied as the second input to the gate 184. The sum two output from the adder-subtractor 182 is applied as the second input to the gate 185, and the sum one output from the adder-subtractor 182 is applied as the second input to the gate 186. The carry one output from the adder-subtractor 182 is not used. The output from the gate 183 is applied through an inverter 187 to one input of each of the three NAND gates 188, 189, and 191. The output from the gate 184 is applied as the second input to the gate 188; the output from the gate 185 is applied as the second input to the gate 189, and the output from the gate 186 is applied as the second input to the gate 191.

Each of a second pair of adder-subtractors 192 and 193 comprises two separate units just as do the adder-subtractors 181 and 182. The output from the gate 188 is applied to one add input of the adder-subtractor 192. The output from the gate 189 is applied to one add input of the adder-subtractor 193, and the output from the gate 191 is applied to a second input to the adder-subtractor 193. A second input to the adder-subtractor 192 comes from the terminal 241 which represents one of the step outputs from the range decoder 240. The terminal 241 is also connected to one input of a NAND gate 194 and to one input of each of NOR gates 196, 197, and 198. Another input to the adder-subtractor 192 is grounded and still another input to the adder-subtractor 192 is connected to the terminal 242, again from the decoder 240. One carry input to the adder-subtractor 192 is not used, and the other is connected to one of the carry outputs from the adder-subtractor 193. Two other inputs to the adder-subtractor 193 are connected to the terminals 243 and 244 from the decoder 240. One carry input to the adder-subtractor 193 is not used and the other one is grounded. Sum output two from the adder-subtractor 192 is applied as the second input to the gate 194 whose output is applied through an inverter 195 to one input of each of the NAND gates 201, 203, and 204. Sum one from the adder-subtractor 192 is applied as the second input to gate 196 whose output supplies the second input to the gate 201. Both carry outputs of the adder 192 are not used. Sum two from the adder-subtractor 193 is applied as the second input to the gate 197 whose output is applied to the second input of the gate 203. The sum one output from the adder-subtractor 193 is applied as the second input to the gate 198 whose output is connected to the second input of the gate 204. The other carry output from the adder-subtractor 193 is not used.

Each of the radar sets or displays has its own D-to-A converter which converts the input information into suitable video form for display. Only one of such D-to-A converters, the unit 220, is shown in FIG. 5B. The output from the gate 201 is applied as the second input to the gate 202 in the converter 220. The output from the gate 203 is applied as a second input to the gate 205, and the output from the gate 204 is applied as a second input to the gate 206 in the converter 220. Each of the gates 202, 205, and 206 has its output applied through a suitable integrating circuit such as the one formed by resistor 208 and capacitor 207 to the control electrode of one of transistors 211, 212, and 213. The collector electrode of the transistor 211 is connected to one side of the resistor 214; the collector electrode of the transistor 212 is connected to one side of a resistor 215, and the collector electrode of the transistor 213 is connected to one side of a resistor 216. The other side of the resistor 214 is connected to the control electrode of a power transistor 226 and through resistor 217 to the other side of the resistor 215, which is connected through a resistor 218 to the other side of the resistor 216, which is connected through a resistor 219 to ground. The control electrode of the transistor 226 is connected through a resistor 221 to a source of negative potential 223. The emitter electrode of the transistor 226 is connected through a resistor 222 to the source of electrical potential and directly to the control electrode of a transistor 227. The collector electrode of the transistor 227 is connected to an output terminal 228 and through a resistor 225 to the collector electrode of the transistor 226 which is connected to a source of positive potential. Each of the adder-subtractors 181, 182, 192, and 193 comprises a pair of full adders within a single unit. The carry output within each unit from one to the carry input to the adder in the same unit is internal and not shown.

The apparatus shown in FIGS. 5A and 5B serves to control and to generate the video signals which operate the display. The information which appears on terminals 162, 163, and 164 of FIG. 4B represents the intensity of the video signal to be displayed in accordance with the information contained in the words stored in the memories 114 and 115. This intensity can be considered pure intensity—the intensity of the reflected radar signal without external influences. However, all radar return pulses, particularly in marine radar are effected by outside influences. In marine radar returns, the intensity of the return signal usually twinkles because neither the radar set nor the target are stationary or fixed in position. Both rock with the motion of the water, and the movement effects the angle the intensity of the radar returns. In addition, the size or width of the radar pulse which is transmitted is usually dependent upon the range being used. Since the energy content of the radar pulse is proportional to the duration of the radar pulse, when the radar set is being used for long range, it is important that the pulse be sufficiently large and contain a sufficient amount of energy so that the return is clearly discernible. For maximum resolution of the display, it is equally important that the radar pulse be narrow for short ranges. Also, in a standard radar system, the intensity of any particular signal or type of signal will vary with the range of the object from which it is reflected. All of these effects are superimposed upon the intensity values which appear on the terminals 162–164 by the apparatus of FIGS. 5A and 5B. The radar receiver used in the particular system constructed had a means for selecting any of three ranges. The three outputs from the range selection switch of the radar receiver are applied to the input terminals 231, 232, and 233 which are connected to the input of a range decoder 234. The inputs are decoded to provide four output signals which represent different pulse widths. Of the four outputs from the decoder 234, the top output (in this case) represents the longest pulse. Whenever an event occurs as represented by the energization of terminal 166, a bit is loaded into the shift register 245. The clock pulses come in on terminal 152a, step the shift register 245, and move the bit which was inserted therein through the five stages of that shift register. The five outputs from the shift register 245 represent the five, equal, different time intervals. These time intervals are passed through one of the gates 249, 251, 252, or 253 which receives an output from the decoder 234. If it is assumed that the selection switch on the radar set selects the shortest range, then the gate 253 is opened and the shortest time interval is passed through the gate 253 and through the gate 254 to the input to the D-to-A converter 220. The signal passing through gate 254 under these conditions is the shortest of the four signals which can pass. If, on the other hand, the longest range is selected, then a signal is passed through the gate 249. The gate 249 receives the last signal out from the register 245 through gate 248, next to the last signal from the register 245 through the gate 247, the second shortest signal through the gate 246, and the shortest signal also through the gate 246. This means that signals pass through the gate 249 for four of the five time intervals of the shift register 245. The resultant output which is applied to the D-to-A converter 220 is equivalent to one long pulse which is four times the length of the pulse passed through the gate 253. The fifth output from the shift register 254 is fed back into the gate 242 to provide an indication that the bit loaded into the register has reached the end.

When either of the two shortest outputs of the decoder 234 are present, the output from the shift register 245 is gated through the gate 242 and passes through the gate 238 to appear on the input to the gate 239. If the terminal 165 is energized to indicate that a line is being displayed, that pulse passes through the gate 239 and the gate 241 and is again loaded into the shift register 245 to continue the operation. This will continue so long as terminal 165 is energized. If no line is being generated, the terminal 165 is not energized and gate 239 does not open. However, each time a comparison is made in the comparators 123 and 124, a signal is passed through the gate 241 to again load the shift register 245. In addition, the output of the gate 241 is applied to the count input of the binary counter 172. The binary counters 172, 173, and 174 are connected in cascade and their outputs are combined together in various forms to provide a varying output signal. For example, the output of the binary counter 172 and the output of the binary counter 174 are both applied to the gate 175. Either of these signals can pass through the gate 175 and the gate 178 to be applied to two inputs of the adder-subtractor 181, unless a signal is also present at the output of the counter 173. The output from the counter 173 passes through the inverter 176 to inhibit the gate 178. At the same time, if the output from the counters 172 and 173 are simultaneously present, the gate 178 is inhibited but a signal passes through the gate 179 to be applied to one of the add inputs of the adder-subtractor 182. As the events occur and terminal 166 is repeatedly energized, the binary counters 172 and 174 are sequentially stepped, and their outputs are combined in various ways to provide different combinations of inputs to the adder-subtractors 181 and 182. In a similar manner, the outputs from the adder-subtractors 181 and 182 are combined in the gates 183–186 to provide different combinations of inputs to the adder-subtractors 192 and 193. In addition to the outputs from the adder-subtractors 181 and 182 being supplied to the adder-subtractors 192 and 193, the range information appearing on the terminals 241–244 is also supplied to the inputs of the adder-subtractors 192 and 193. These two sets of inputs are combined in the adder-subtractors 192 and 193 and in the gates 194–198 and 201–203 to produce an output signal which is proportional to the range of the target and the pseudorandom output from the binary counter 172–174 and adder-subtractors 181 and 182 combination. This provides three levels of intensity which can vary about the intensity information appearing on the terminals 162–164. The composite intensity information determines which of the three gates 201, 203, or 204 will be open at any time and which of the gates 202, 205, or 206 will be opened whenever a strobe pulse is applied to the gate 254. In the D-to-A converter 220, the resistors 214, 215, and 126 are of different values, and when one of the transistors 211, 212, or 213 is rendered conductive by the opening of the gate which supplies its base electrode, the value of the signal passed onto the power output amplifiers 226 and 227 will depend upon the values of the resistors in the circuit. In addition, the intensity of the signal which appears on the display is proportional to the length of time that the gate 202, 205, or 206 remains open. The circuit 220 operate as a D-to-A converter, and the amplitude of its output will be determined by which of the three transistors 211–213 is rendered conductive while the length of time that output exists will be determined by the length of the pulse applied from the gate 254 to the gates 202, 205, and 206. Thus, the radar display which is connected to the output terminal 228 will receive as its input the analog signal with the amplitude and the time duration determined as indicated above.

The above specification has disclosed a new and improved electronic training device for simulating the operation of a radar system. The system of this invention utilizes digital computers to store a vast amount of radar target information and to translate that radar target information into polar coordinates suitable for display on a plan position indicator. The circuitry disclosed in the specification converts the information stored in the computer into the form suitable for controlling a radar display, and it also generates variable ambient effects which are superimposed upon the basic radar target information. The system of this invention utilizes computer and electrical circuitry efficiently to reduce both initial and maintenance costs. It is realized that the above description may indicate to those skilled in the art additional ways in which the principles of this invention may be utilized without departing from its spirit. It is, therefore, intended that this invention be limited only by the scope of the appended claims.

What is claimed is:

1. A training system for simultaneously simulating the operation of a plurality of radar receivers each of which is operating on its own mission in its own portion of the earth's surface; said system comprising a plurality of radar displays; a first memory device for storing digital information representing the location and reflection intensity of those radar targets situated throughout the world which said system is to display; the information stored in said first memory device comprising information representing individual radar targets and information representing lines of radar reflective material, the information representing said lines of radar material defining the location and elevation of the end points of said lines only, said digital information representing each of said targets and each of said end points by individual words which comprise a first portion defining the location of the target or end point, a second portion defining the elevation of said target or end point, and a third portion for control purposes; a second memory device for storing at any time digital information representing all of the radar targets and lines within the simulated range of a single radar display; addressing and first conversion means using as addresses the simulated location of one of said plurality of radar displays for selecting that information stored in said first memory device which represents all of the targets and lines within the range of said radar display at that time, for converting said selected information from the form in which it is stored into the form in which it is to be used, and for transferring said selected information into said second memory device; a plurality of storage devices each associated with a single radar display; second conversion means for simultaneously converting the digital information contained in all of said storage devices into video signals and for applying said video signals to the appropriate radar displays; and means for thereafter initiating the operation of said addressing and first conversion means to select and convert information for said other radar displays in sequence.

2. The training system defined in claim 22 wherein said second conversion means includes means for identifying the position of the simulated radar receiver at any time, means for simulating the orientation of the antennas of all of the simulated radar receivers at any time, a register complex for containing segment information, and means for transferring from the information stored in the individual storage devices information of one antenna sweep segment into said register complex.

3. The training system defined in claim 2 wherein said second conversion means further includes a range counter, a clock complex for supplying timed pulses to be counted by said range counter, said clock complex comprising a plurality of pulse generators operating different frequencies, and means for selecting one of said pulse generators to supply pulses to said counter at any time.

4. The training system defined in claim 3 wherein said means for selecting one of said pulse generators comprises a plurality of switching means, means for connecting the control inputs of said switching means to the outputs of said range counter, and means for connecting said switching means between said pulse generators and the input to said counter so that the highest frequency pulse generator supplies pulses to said counter during the lowest counts of said counter and said lower frequency pulse generators are individually connected to supply pulses to the input of said counter as the count of said counter increases.

5. The training system defined in claim 4 wherein said register complex comprises at least two registers, and further including a comparator for each of the registers in said register complex, means for applying the contents of each register to one input of the comparator associated therewith, and means for applying the contents of the range counter to the other inputs of all of said comparators, said comparator generating output signals whenever correspondence is recognized between the contents of the registers and the contents of said range counter.

6. The training system defined in claim 5 further including means responsive to the generation of an output signal by a comparator for causing the register associated with that comparator to supply new information to said comparator.

7. The training system defined in claim 6 wherein each of said registers contains information representing a plurality of targets and wherein each of said registers has associated with it means for causing the information representing the individual targets to appear at the output of the registers in sequence in response to said signals from said comparators.

8. The training system defined in claim 7 wherein the portion of the information applied by the registers to the comparators comprises information which represents location, a basic intensity decoder, and means for applying to the input of said basic intensity decoder the output from said registers which represents elevation information of said radar target.

9. The training system defined in claim 8 further including means for receiving information representing control information from said registers, and means for decoding said control information into signals representing relative the priorities of information to be displayed.

10. The training system defined in claim 9 further including a decoding means for decoding the contents of the range counter into several signals representing distance from said simulated radar antenna, and means for combining said basic intensity information and said range signals to produce video signals having a basic intensity which is modified by the distance of the simulated target from said simulated antenna.

11. The training system defined in claim 10 further including means for generating generally random signals, and means for combining said modified intensity signals with said random signals to randomly modify the intensity of the signal to be displayed so that said displayed signal varies in intensity in a generally random manner.

12. A training system for training personnel in the operation and use of radar equipment; said system comprising a plurality of radar receivers; a first large scale storage means for storing digital information representing all of the radar targets to be displayed on all of said radar receivers; a second temporary storage means for storing information relating to all of the targets to be displayed at any time by any one of said radar receivers; means for addressing said first storage means and for applying to said addressing means a simulated location of any of said radar receivers at any time; said addressing means responding to said simulated location for reading from said first storage means information relating to all radar targets within the range of said radar receiver and for writing said information into said second storage means; means for indicating when said writing means has been completed to initiate the application to said addressing means of the location of another of said radar sets; a plurality of separate stores including one such store for each of said radar sets; means for transferring the information stored in said second storage means from said second storage means into the store associated with the radar receiver whose location initiated the reading of said information from said first storage means; the information stored in said stores including for each radar target a portion relating to the location of the target with respect to the radar receiver, a portion relating to the elevation of said radar target and a portion having control significance; means for determining when said transfer is completed to initiate the transfer of information stored in said second storage means and relating to targets of the next radar receiver into the store associated therewith, and conversion means for converting the information in said separate stores into video signal for application to the individual radar receivers.

13. The training system defined in claim 12, said conversion means further including a counter, a plurality of clock pulse generators for supplying pulses of different frequencies to said counter, gating means connected between said individual clock pulse generators and said counter, and means for connecting count outputs from said counter to said individual gating means for connecting different individual pulse generators to the input of said counter as the count within said counter changes.

14. The training system defined in claim 13 further including at least one comparator, means for applying that portion of the information relating to the location of a single target to one side of said comparator, means for applying the count outputs from said counter to the other side of said comparator, said comparator generating an output signal when it detects a correspondence between the information applied to its two sides, and means connected to the output of said comparator for triggering said conversion means in response to the output signal from said comparator.

15. The training system defined in claim 12 further including intensity decoding means, means for applying to said intensity decoding means that portion of each target information which relates to the elevation of said target, and means responsive to the output of said intensity decoding means for selecting a level of intensity in said conversion means.

16. The training system defined in claim 15 further including an intensity modulating means interposed between said intensity decoder and said second conversion means, said modulating means including a random signal generator, means for adding together the output of said random signal generator and the output of said intensity decoder, and means for applying the output from said modulating means to the input of said conversion means.

* * * * *

UNITED STATES PATENT OFFICE
CERTIFICATE OF CORRECTION

Patent No. 3,808,711  Dated May 7, 1974

Inventor(s) Robert J. Membrino et al

It is certified that error appears in the above-identified patent and that said Letters Patent are hereby corrected as shown below:

Column 7, line 20, delete "has".

Column 13, line 67 (last line), "152a" should be --152--.

Column 16, line 4, after "potential", insert --224--.

Column 16, line 51, "152a" should be --152--.

Signed and sealed this 12th day of November 1974.

(SEAL)
Attest:

McCOY M. GIBSON JR.
Attesting Officer

C. MARSHALL DANN
Commissioner of Patents